United States Patent [19]

Murray et al.

[11] 4,247,573

[45] Jan. 27, 1981

[54] PROTEIN BINDER IN FOOD COMPOSITIONS

[75] Inventors: E. Donald Murray, Winnipeg; Terrence J. Maurice, Colborne; Larry D. Barker, Cobourg, all of Canada

[73] Assignee: General Foods, Limited, Toronto, Canada

[21] Appl. No.: 22,097

[22] Filed: Mar. 20, 1979

[30] Foreign Application Priority Data

Mar. 23, 1978 [CA] Canada ................................ 299713

[51] Int. Cl.³ .............................. A23L 1/32; A23J 3/00
[52] U.S. Cl. .................................... 426/656; 426/657; 426/614; 260/112 R; 260/123.5
[58] Field of Search ................ 426/583, 614, 657, 656

[56] References Cited

U.S. PATENT DOCUMENTS

| 2,331,619 | 10/1943 | Morse .................................. 260/123.5 |
| 2,887,395 | 5/1959 | Rowe et al. ........................ 260/123.5 |
| 3,870,801 | 3/1975 | Tombs .............................. 426/276 X |
| 3,987,213 | 10/1976 | Hawkins .............................. 426/656 |
| 4,029,825 | 6/1977 | Chang .............................. 426/583 X |
| 4,103,038 | 7/1978 | Roberts ............................ 426/657 X |
| 4,168,322 | 9/1979 | Buckley et al. .................. 426/657 X |

OTHER PUBLICATIONS

Altschul, A. M. "Processed Plant Protein Foodstuffs" Academic Press Inc., N.Y., 1958, p. 254.

*Primary Examiner*—Robert A. Yoncoskie
*Attorney, Agent, or Firm*—Sim & McBurney

[57] ABSTRACT

A protein micellar mass is used to replace or extend egg white normally used in various food compositions, as a binder. The protein micellar mass exhibits similar binding and heat coagulation properties to egg white.

9 Claims, No Drawings

4,247,573

PROTEIN BINDER IN FOOD COMPOSITIONS

FIELD OF INVENTION

The present invention relates to food compositions.

BACKGROUND TO THE INVENTION

Egg white (albumen) is widely used in the food industry and in culinary applications. Among the useful properties of egg white are its capacity to bind food components together and then to be coagulated on heating to a solidified mass. The binding and heat coagulating capacities of egg white are used in a variety of food products.

Egg white is becoming an increasingly expensive product and attempts have been made to provide a cheaper substitute for egg white. No successful product has been forthcoming, however, and those products that have been suggested have lacked one or the other of the binding and coagulating properties of egg white.

SUMMARY OF INVENTION

It has been surprisingly found that a unique protein isolate, protein micellar mass, exhibits both the binding and heat coagulating properties of egg white. In accordance, therefore, with this invention, there is provided a food composition which normally includes or is intended to include egg white as a food component binder for the components of the composition wherein the egg white is wholly or partially replaced by at least one protein micellar mass.

GENERAL DESCRIPTION OF INVENTION

Protein micellar mass used in the compositions of this invention is a unique protein isolate, the production of which from various protein sources is described in detail in our Canadian Pat. No. 1,028,552, (and in the corresponding U.S. Pat. No. 4,169,090, the disclosure of which is incorporated herein by reference).

The procedure described in this Canadian patent for formation of the protein micellar mass involves a controlled two-step operation, in which, in the first step, the protein source material is treated with an aqueous food grade salt solution at a temperature of about 15° to about 35° C., a salt concentration of about 0.2 to about 0.8 and a pH of about 5.5 to about 6.3 to cause solubilization (or salting-in) of the protein, usually in about 10 to about 60 minutes, and, in the second step, the aqueous protein solution is diluted to decrease its ionic strength to a value less than about 0.1.

The decrease of the ionic strength of the aqueous protein solution preferably is achieved by feeding the concentrated solution into a body of cold water containing sufficient volume such that the ionic strength is decreased to a value less than about 0.1. Preferably, the body of cold water has a temperature of about 5° to about 15° C.

The dilution of the aqueous protein solution, which may have a protein concentration, for example, up to about 10% w/v, causes association of protein molecules to form discrete highly proteinaceous micelles which settle in the form of an amorphous highly viscous, sticky, gluten-like mass of protein having a moisture content of about 60 to about 75% by weight. The amorphous protein mass so formed is referred to herein as "protein micellar mass", and is abbreviated to PMM. The wet PMM may be dried to a powder for use in that form. Drying of the wet PMM may be achieved using any convenient drying technique, such as, spray drying, freeze drying or vacuum drum drying.

The protein materials from which the wet PMM is formed may vary widely and include plant proteins, for example, starchy cereals, such as, wheat, corn, oats, rye, barley and triticale; starchy legumes, such as, field peas, chickpeas, fababeans, navy beans and pinto beans; and oil seeds, such as, sunflower seed, peanuts, rapeseed and soy beans; animal proteins, such as, serum proteins; and microbial proteins, i.e., single cell proteins. Preferably, the protein source is a plant protein owing to the readily available nature of the materials.

Neither the source plant proteins from which PMM may be formed nor isoelectric isolates thereof exhibit the binding and heat coagulating properties shared by PMM and egg white. The mild processing operations effected on the source protein to form the PMM ensure that the protein is in a substantially undenatured form, as determined by calorimetry.

The PMM, most conveniently in dry form although the wet form may sometimes be used, may be used in a wide variety of food compositions wherein egg white conventionally is used as a food component binder, as a substitute for or extender for the egg white. Although a PMM from a single protein material usually is employed, mixtures of two or more PMM's from different protein materials may be used, if desired, thereby achieving amino acid complementation, which is of considerable nutritional importance. The concentration of PMM used in the various applications varies depending on the particular application. PMM may be produced by the above-described procedure at a much lower cost than the current cost of egg white so that its use in place of all or part of the egg white leads to considerable cost savings.

The present invention, therefore, provides an egg white substitute which possesses binding and heat coagulating properties similar to egg white while, at the same time, being cheaper to produce than egg white.

Examples of the variety of products wherein PMM may be used as a binder include cakes, muffins, pancake mixes, meat loaf and meat loaf analogs, and bacon analogs.

The production of protein micellar mass as described above results in a wet product having occluded water which also contains dissolved food grade salt, usually mainly sodium chloride. Upon drying, the sodium chloride remains entrapped in the PMM. It has been found that, as this concentration of sodium chloride increases, the binding capacity of the PMM decreases and, overall, the binding capacity of the PMM in any given food composition decreases with the total concentration of sodium chloride present, arising from the PMM and any additional salt necessary in the composition.

In view of the desire for as high a binding capacity as possible and thereby use of the lowest concentrations of PMM to achieve the desired binding capacity, it is preferred in most cases to minimize the concentration of sodium chloride entrapped in the PMM.

Improvements in the basic process of PMM production as described in Canadian Pat. No. 1,028,552 have been developed to control the concentration of sodium chloride entrapped in the PMM, and are described in copending U.S. patent application Ser. No. 022,229 filed concurrently herewith, the disclosure of which is incorporated herein by reference. As set forth therein, the initial extraction is effected over a pH range of about 5 to about 6.8, the protein solution is concentrated to increase the protein concentration of the solution while maintaining the ionic strength substantially constant, and thereafter is diluted to an ionic strength below about 0.2 to cause the protein micelle formation. The procedures described therein may be used to decrease the entrapped salt concentration in the PMM for use in this invention.

The concentration of entrapped salt may be decreased by inducing the protein micellar mass to settle, so as to exclude aqueous phase from the settled mass. The inducing of the coalescence preferably is effected by centrifugation of the system after cloud formation. As the protein micelles are induced to coalesce to form a dense viscous sticky mass, considerable water is driven out from the mass, so that dissolved salt in the excluded water is absent from the mass, so that the final salt level of the PMM, both in the wet and dry forms, is decreased.

In addition, the concentration of salt entrapped in the PMM may be decreased and thereby the binding capacity of the PMM may be increased, by suitable treatment of wet PMM, such as, by dialysis. Another technique which may be used to maximize the binding capacity of the PMM in food compositions utilizing added salt is to control the quantity of added salt to allow for that entrapped in the PMM, or, if practical, to delay incorporation of the added salt into the product mixture until just prior to heat coagulating, thereby minimizing the interaction of protein and salt. Combinations of these salt control techniques may be used where appropriate.

EXAMPLES

EXAMPLE 1

This Example compares the binding capacity of various PMM samples and egg white under different conditions.

To test the binding capacity of various materials, a model system was set up consisting of the following ingredients:

Silicon dioxide powder: 36% w/w
Textured Vegetable Protein (TVP): 24% w/w
Water: 36% w/w
Protein Binder: 4% w/w In those instances where the protein binder concentration was varied from the 4% w/w level, the concentration of the silicon dioxide powder was adjusted accordingly. The powder and TVP were dry mixed and to the dry mix was added the tested quantity of dry PMM rehydrated in the water. The resulting wet system was mixed using a mechanical mixer and petri dishes (Falcon, Model 1004) were filled with 81 g of sample. The sample was compressed until its thickness was the same as the depth of the petri dish.

The sample then was heat set in a microwave oven having a power output of 490 watts per hour and cut into three equal sized pieces. After cooling to room temperature, the samples were tested for cohesiveness using a texturometer.

Cohesiveness is determined by the strength of the internal bonds, it is measured in arbitrary units and is the ratio of recorded deformations of the test material in two successive impacts by the plunger of the "G.F. Texturometer". The G.F. Texturometer and its operation are described in detail in an article entitled "The Texturometer-A New Instrument for Objective Texture Measurement" by H. H. Friedman et al published in J. of Food Sciences, Vol. 28, p. 390 (1963). Higher values indicate greater cohesiveness, with rubber typically having a cohesiveness approaching one.

A number of cohesiveness tests were conducted using the above-described technique and compared with egg white. One set of tests was effected using varying protein levels at a fixed heating time of 70 secs. and a fixed pH of 6.3, another set of tests was effected using varying heating times at a fixed protein level of 4% w/w and a fixed pH of 6.2, and a third set of tests was effected using varying pH values at a fixed protein level of 4% w/w and a fixed heating time of 70 secs.

The results of the tests are reproduced in the following Table I:

TABLE I

| Variable Tested | | Protein Material | | | |
|---|---|---|---|---|---|
| | | Field Pea PMM | Fababean PMM | Soybean PMM | Egg White |
| Protein level % w/w | 3 | 0.45 | 0.3 | — | 0.6 |
| | 4 | 0.6 | 0.4 | — | 0.75 |
| | 5 | 0.65 | 0.55 | — | 0.8 |
| | 6 | 0.7 | 0.65 | — | 0.75 |
| | 7 | 0.75 | 0.72 | — | 0.75 |
| Heating Time (Secs) | 40 | — | 0.55 | 0.5 | 0.62 |
| | 60 | — | 0.59 | 0.55 | 0.72 |
| | 70 | — | 0.62 | 0.58 | 0.78 |
| | 90 | — | 0.66 | 0.6 | 0.79 |
| | 110 | — | 0.7 | 0.65 | 0.8 |
| pH | 5.8 | 0.46 | 0.55 | 0.67 | 0.78 |
| | 6.0 | 0.46 | 0.57 | 0.63 | 0.75 |
| | 6.5 | 0.46 | 0.56 | 0.57 | 0.72 |
| | 7.0 | 0.45 | 0.56 | 0.53 | 0.70 |
| | 7.5 | 0.5 | 0.56 | 0.50 | 0.73 |

The results of the above Table I illustrate the cohesive capability of the PMM samples in the model system and the variation of that capability with quantity, heating time and pH.

In general, in the model system, egg white showed only slightly superior binding potential (cohesiveness) to the PMM samples at the same protein concentrations, and these differences could be offset by raising the level of PMM binder used. In all cases, increased heating time increased cohesiveness, while changes in pH over the range tested had little effect on any protein system.

EXAMPLE II

This Example compares the binding capacity of various PMM samples at various concentrations of sodium chloride.

Using the model system described in Example I, different salt concentrations were added to the water prior to rehydration of the PMM and in each case 4% w/w of the protein was used. The cohesiveness value was determined for each sample. The results are reproduced in the following Table II:

TABLE II

| Salt Concentration (M) | Protein Material | | | |
|---|---|---|---|---|
| | Field Pea PMM | Fababean PMM | Soybean PMM | Egg White |
| 0 | 0.61 | 0.61 | 0.56 | 0.72 |
| 0.1 | 0.55 | 0.55 | 0.52 | 0.74 |
| 0.2 | 0.53 | 0.48 | 0.47 | 0.71 |
| 0.3 | 0.51 | 0.42 | 0.42 | 0.66 |
| 0.4 | 0.50 | 0.41 | 0.33 | 0.62 |
| 0.5 | 0.49 | 0.40 | 0.33 | 0.55 |

It will be seen from the results of the above Table II that there is a general trend towards lower cohesiveness values both for egg white and PMM samples as the concentration of salt increases.

EXAMPLE III

This Example illustrates the effect of dialysis on the cohesive properties of PMM.

Samples of fababean PMM were dialized to remove residual salt and the cohesiveness value of the resulting material was determined using the model system described in Example I. The initial value was 0.61 and the dialized PMM exhibited a value of 0.67.

EXAMPLE IV

This Example illustrates the effect of centrifugation on the salt content of PMM.

A protein concentrate (about 50 wt. % protein) of field peas was mixed with an 0.4 molar sodium chloride solution at a 10% w/v level at a temperature of about 25° C. The mixture was stirred for about 25 minutes at a pH of about 5.9 to 6.1. The aqueous protein extract was separated from residual matters and had a protein concentration of about 40 mg/ml.

The extract was diluted into cold water having a temperature of about 8° C. at a volume ratio of 1 to 5 (i.e. 1 part of extract to 5 parts of water). Immediately upon dilution, a white cloud of protein micelles formed in the dilution system.

The dilution system was then centrifuged at 5000 g for 10 minutes to form a highly viscous gelatinous precipitate in the bottom of the vessel. The supernatant liquid and wet PMM were separated and the wet PMM was spray dried and analyzed for salt and protein.

The following Table III reproduces the analytical results for the dry PMM samples as compared with dry PMM samples formed by equivalent procedures omitting the centrifuging step.

TABLE III

| Protein Weight % Centrifuge | | Salt content Dry PMM wt. % | |
|---|---|---|---|
| With | Without | With | Without |
| >99% | 83.2 | 0.12 | 5.36 |

The results of the above Table III indicate that a significant decrease in salt concentration is effected utilizing the centrifugation step.

EXAMPLE V

This Example illustrates the use of PMM samples in various food mixes as a substitute for egg white.

Several commercial dry food mixes conventionally used in one case for baking cakes, in a second case for baking muffins and in a third case for cooking pancakes and normally requiring the addition of water and egg white were taken. The egg white and at least part of the water were replaced by a 15% w/v aqueous solution of PMM samples from field peas and soybean on the basis of 33 g of PMM for each egg white required by the recipe.

In each case, the cooked product was substantially the same in taste and texture to the same product formed using egg white.

EXAMPLE VI

This Example illustrates the formation of a white layer cake using PMM in place of egg white.

A cake mix was made up from the following recipe:

Flour: 2 cups
Sugar: 1⅓ cups
Salt: teaspoon
Vegetable Shortening: ½ cup
Milk: 1 cup
Vanilla: 1 tsp.
Baking Powder: 3½ tsp.
PMM*: 132 g.

* PPM was added as a 15% aqueous solution thereof which also provided all the water requirement and mixes were made from PMM samples from field peas and soybeans. The mix, after processing to a smooth consistency, was placed in a bake tin and baked in an oven at 350° F. for 30 minutes.

The resulting cake was tested and found to exhibit similar taste and texture characteristics to a cake baked from a mix using 4 egg whites in place of the PMM.

EXAMPLE VII

This Example illustrates the formation of a bacon analog using PMM as replacement for part of the egg white.

Following the procedure outlined in U.S. Pat. No. 3,840,677, the red and white phases of a bacon analog were prepared, utilizing the components and quantities outlined in Tables I and II thereof with the exception that 50% of the egg white ("albumen") of the white ("fatty") phase was replaced by dry fababean PMM.

The resulting bacon analog was sliced into strips and cooked. The strips retained their structural integrity during the cooking and the taste and texture of the cooked product were indistinguishable from those of similarly cooked strips wherein PMM was not used to replace part of the egg white.

EXAMPLE VIII

This Example illustrates the formation of a meat loaf analog using PMM in place of egg white.

A meat loaf analog mix was made up from the following recipe:

TVP: 16.5% w/w
Fat: 10.7
Milk solids: 4.6
Salt: 0.9
Flavouring: 9.3
Water: 53.4*
PMM: 4.6*

* The water and PMM were added as a 15% aqueous solution of PMM from field peas along with additional water. This recipe normally uses the white from two eggs.

After cooking the meat loaf analog, the taste and texture were found to be comparable to a similar meat loaf analog made from the same ingredients but using egg white in place of the PMM.

Examples V to VIII illustrate the versatility of PMM in replacing or extending egg white in conventional widely varying food compositions wherein egg white is used as a food component binder.

SUMMARY OF DISCLOSURE

In summary of this disclosure, the present invention provides food compositions wherein egg white is substituted for by a unique protein isolate. Modifications are possible within the scope of the invention.

What we claim is:

1. In a food composition comprising a foodstuff and egg white as a food component binder, the improvement which comprises substituting at least a binding-effective amount of at least one protein micellar mass for at least part of said egg white, said protein micellar mass being formed by a process which comprises:

(a) extracting protein from proteinaceous material with an aqueous food grade salt solution at a temperature of about 15° to about 35° C., a salt concentration of about 0.2 to about 0.8 ionic strength and a pH of about 5.5 to about 6.3 to form a protein solution, (b) diluting said protein solution to an ionic strength less than about 0.1 to cause precipitation of a protein isolate in the form of said protein micellar mass, and (c) collecting the precipitated protein micellar mass.

2. The composition of claim 1, wherein said process includes the step of centrifuging the precipitating protein micellar mass to assist in settling the same.

3. In a food composition comprising a foodstuff and egg white as a food component binder, the improvement which comprises substituting at least a binding-effective amount of at least one protein micellar mass for at least part of said white, said protein micellar mass being formed by a process which comprises:

(a) extracting protein from proteinaceous material with an aqueous food grade salt solution at a temperature of about 15° to about 35° C., a salt concentration of at least about 0.2 ionic strength and a pH of about 5 to about 6.8 to form a protein solution, (b) concentrating the protein solution to increase the protein concentration thereof while maintaining the ionic strength thereof substantially constant, (c) diluting the resulting solution to a lower ionic strength less than about 0.2 to cause the formation of discrete protein particles in the aqueous phase, and (d) settling the protein micelles to form said protein micellar mass.

4. The composition of claim 3 wherein said process further includes the step of centrifuging the precipitating micellar mass to assist in settling the same.

5. The composition of claim 1, 2, 3 or 4, wherein said process includes the further steps of separating said settled protein micellar mass from supernatant liquor and drying said separated protein micellar mass to form a dry protein isolate, and wherein said dry protein isolate is used as said protein micellar mass.

6. The composition of claim 1, 2, 3 or 4, wherein the ionic strength is decreased by feeding the protein solution into a body of water having a temperature of about 5° to about 15° C. and containing a sufficient volume of water such that the ionic strength is decreased to said value.

7. The composition of claims 1 or 3 wherein said protein micellar mass is relatively free of food grade salt.

8. The composition of claim 1, 2, 3 or 4, wherein said proteinaceous material is selected from the group consisting of plant proteins, animal proteins and microbial proteins.

9. The composition of claim 8 wherein said proteinaceous material is selected from the group consisting of cereals, legumes and oil seeds.

* * * * *